(12) United States Patent
Monterroza et al.

(10) Patent No.: US 9,933,264 B2
(45) Date of Patent: Apr. 3, 2018

(54) SYSTEM AND METHOD FOR ACHIEVING FAST AND RELIABLE TIME-TO-CONTACT ESTIMATION USING VISION AND RANGE SENSOR DATA FOR AUTONOMOUS NAVIGATION

(71) Applicant: HRL Laboratories, LLC, Malibu, CA (US)

(72) Inventors: Fredy Monterroza, Canoga Park, CA (US); Kyungnam Kim, Oak Park, CA (US); Deepak Khosla, Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/429,153

(22) Filed: Feb. 9, 2017

(65) Prior Publication Data
US 2017/0314930 A1    Nov. 2, 2017

Related U.S. Application Data

(63) Continuation-in-part of application No. 15/271,025, filed on Sep. 20, 2016, and a continuation-in-part of
(Continued)

(51) Int. Cl.
*G06K 9/00* (2006.01)
*G01C 21/20* (2006.01)
(Continued)

(52) U.S. Cl.
CPC ............. *G01C 21/20* (2013.01); *G01C 23/00* (2013.01); *G05D 1/0055* (2013.01);
(Continued)

(58) Field of Classification Search
None
See application file for complete search history.

(56) References Cited

U.S. PATENT DOCUMENTS

| 6,480,615 B1 * | 11/2002 | Sun | ......................... G06T 7/215 |
| | | | 382/103 |
| 6,597,807 B1 * | 7/2003 | Watkins | ............. G02B 27/2228 |
| | | | 348/33 |

(Continued)

OTHER PUBLICATIONS

Time to contact—Surface, Berthold K.P. Horn et al., IEEE, 1-4244-1068-1, 2007, pp. 68-74.*

(Continued)

*Primary Examiner* — Jayesh A Patel
(74) *Attorney, Agent, or Firm* — Tope-McKay & Associates

(57) ABSTRACT

Described is a robotic system for detecting obstacles reliably with their ranges by a combination of two-dimensional and three-dimensional sensing. In operation, the system receives an image from a monocular video and range depth data from a range sensor of a scene proximate a mobile platform. The image is segmented into multiple object regions of interest and time-to-contact (TTC) value are calculated by estimating motion field and operating on image intensities. A two-dimensional (2D) TTC map is then generated by estimating average TTC values over the multiple object regions of interest. A three-dimensional TTC map is then generated by fusing the range depth data with image. Finally, a range-fused TTC map is generated by averaging the 2D TTC map and the 3D TTC map.

21 Claims, 9 Drawing Sheets

Related U.S. Application Data application No. 14/795,884, filed on Jul. 9, 2015, which is a continuation-in-part of application No. 14/680,057, filed on Apr. 6, 2015.

(60) Provisional application No. 62/221,523, filed on Sep. 21, 2015, provisional application No. 62/293,649, filed on Feb. 10, 2016.

(51) Int. Cl.
    G06T 7/11 (2017.01)
    G06T 7/70 (2017.01)
    G01C 23/00 (2006.01)
    G05D 1/00 (2006.01)
    G06N 3/08 (2006.01)

(52) U.S. Cl.
    CPC ........... *G06K 9/00201* (2013.01); *G06N 3/08* (2013.01); *G06T 7/11* (2017.01); *G06T 7/70* (2017.01)

(56) References Cited

U.S. PATENT DOCUMENTS

| | | | | |
|---|---|---|---|---|
| 7,620,265 | B1* | 11/2009 | Wolff | G06T 5/50 382/254 |
| 8,160,354 | B2 | 4/2012 | Paquier | |
| 8,594,378 | B2* | 11/2013 | Mori | G06T 7/20 348/169 |
| 8,743,176 | B2* | 6/2014 | Stettner | G01S 17/023 348/42 |
| 8,971,611 | B2* | 3/2015 | Takeshita | H04N 13/026 382/154 |
| 9,043,108 | B2* | 5/2015 | Sekiguchi | B60T 7/22 340/435 |
| 2003/0002731 | A1 | 1/2003 | Wersing | |
| 2004/0042086 | A1* | 3/2004 | Beystrum | G02B 23/125 359/629 |
| 2004/0239670 | A1* | 12/2004 | Marks | A63F 13/10 345/419 |
| 2008/0201282 | A1 | 8/2008 | Garcia | |
| 2009/0033910 | A1* | 2/2009 | Elie | G03B 35/00 356/4.01 |
| 2010/0305857 | A1* | 12/2010 | Byrne | G06T 7/73 701/301 |
| 2012/0062372 | A1* | 3/2012 | Augst | G06K 9/00798 340/435 |
| 2012/0219183 | A1* | 8/2012 | Mori | G06T 7/20 382/103 |
| 2013/0156339 | A1* | 6/2013 | Hayata | H04N 13/00 382/268 |
| 2013/0162768 | A1* | 6/2013 | Lie | H04N 13/0264 348/43 |
| 2013/0286017 | A1* | 10/2013 | Sanjuan | G06T 15/00 345/427 |
| 2014/0118485 | A1* | 5/2014 | Luo | B60R 1/00 348/36 |
| 2015/0269485 | A1 | 9/2015 | Julian | |
| 2015/0379720 | A1* | 12/2015 | Herraez | H04N 13/026 348/43 |
| 2016/0057393 | A1* | 2/2016 | Won | B60R 1/00 348/148 |

OTHER PUBLICATIONS

Hierarchical framework—estimation, Berthold K.P. Horn et al, IEEE, 978-1-4244-3504-3, 2009, pp. 1394-1400.*
Time to Collision—Motion, Shrinivas Pundlik et al., Springer, Part I, LNCS 6938, 2011, pp. 732-741.*
A comparison of three—Contact, Guillem at al, IEEE, 978-1-4244-3804-4, 2009, pp. 4565-4570.*
International Search Report of the International Searching Authority for PCT/US2017/017275; dated Apr. 25, 2017.
The Written Opinion of the International Searching Authority for PCT/US2017/017275; dated Apr. 25, 2017.
Notification of Transmittal of International Search Report and the Written Opinion of the International Searching Authority for PCT/US2017/017275; dated Apr. 25, 2017.
Berthold K.P. Horn et al., 'Time to Contact Relative to a Planar Surface', 2007 IEEE Intelligent Vehicles Symposium, Aug. 13, 2007; See abstract; and sections II-IV.B.
Lili Huang et al., 'Tightly-coupled LIDAR and Computer Vision Integration for Vehicle Detection', 2009 IEEE Intelligent Vehicles Symposium, Jul. 14, 2009; See section IV.
Guillem Alenya et al., 'A comparison of three methods for measure of Time to Contact', IEEE/RSJ International Conference on Intelligent Robots and Systems 2009, Dec. 15, 2009; See sections II-IV.C.
M. S. Darms, P. E. Rybski, C. Baker and C. Urmson, "Obstacle detection and tracking for the urban challenge," in IEEE Transactions on Intelligent Transportation Systems, 2009, pp. 475-485.
Sagar and Viser, Obstacle Avoidance by Combining background subtraction, optical flow and proximity Estimation, International Micro Air Vehicle Conference and Competition 2014 (IMAV), Delft, The Netherlands, 2014, pp. 1-8.
Lenz, Saxena, Low-Power Parallel Algorithms for Single Image based Obstacle Avoidance in Aerial Robots, International Conference on Intelligent Robots and Systems (IROS) 2012, pp. 1-8.
Roberts and Dellaert, Direct Superpixel Labeling for Mobile Robot Navigation, International Conference on Intelligent Robots and System (IROS) 2014, pp. 1-6.
Sukhatme, Combined Optical-Flow and Stereo-Based Navigation of Urban Canyons for a UAV. International Conference on Robots and Systems (IROS), 2005, pp. 1-8.
Roland Brockers, Yoshiaki Kuwata, Stephan Weiss, Lawrence Matthies, Micro air Vehicle Autonomouse Obstacle Avoidance from Stereo-Vision, Unmanned Systems Technology, 2014, pp. 1-12.
Andrew J. Barry and Russ Tedrake. "Pushbroom stereo for highspeed navigation in cluttered environments." In 3rd Workshop on Robots in Clutter: Perception and Interaction in Clutter, Chicago, Illinois, Sep. 2014, pp. 3046-3052.
Matthias Nieuwenhuisen , David Droeschel , Dirk Holz , Sven Behnke, "Omni-directional Obstacle Perception and Collision Avoidance for Micro Aerial Vehicles," Robotics Science and Systems (RSS) 2013, pp. 1-4.
J. Zhang, M. Kaess, and S. Singh, "Real Time Depth Enhanced Monocular Odometry," International Conference on Intelligent Robots and System (IROS) 2014, pp. 4973-4980.
Georg Klein and David Murray Parallel Tracking and Mapping for Small AR Workspaces in Proc. International Symposium on Mixed and Augmented Reality (2007), pp. 1-10.
B.K.P. Horn & B.G. Schunck, "Determining Optical Flow," Artificial Intelligence, vol. 16, No. 1-3, Aug. 1981, pp. 185-203.
Alexander L. Honda, Yang Chen, Deepak Khosla, "Robust static and moving object detection via multi-scale attentional mechanisms", Proceedings of SPIE vol. 8744, 87440S (2013), pp. 1-9.
Hassenstein, B., and Reichardt, W. (1956). Systemtheoretische Analyse der Zeit-, Reihenfolgen- und Vorzeichenauswertung bei der Bewegungsperzeption des Riisselkiifers Chlorophanus. Z Naturforsch IIb, pp. 513-524.
Reichardt, W. (1961). Autocorrelation, a principle for the evaluation of sensory information by the central nervous system. In Sensory Communication, W.A. Rosenblith, ed. (New York, London: MIT Press and Wiley), pp. 303-317.
Haag, J., Denk, W., & Borst, A. (2004). Fly motion vision is based on Reichardt detectors regardless of the signal-to-noise ratio. Proceedings of the National Academy of Sciences of the United States of America, 101(46), pp. 16333-16338.
Reid R. Harrison and Christof Koch (1998) an Analog VLSI Model of the Fly Elementary Motion Detector. In Advances in Neural Information Processing Systems 10, M. I. Jordan, M. J. Kearns, S. A. Solla, eds. MIT Press, Cambridge, MA, pp. 880-886.

(56) References Cited

OTHER PUBLICATIONS

Energy-Efficient Neuron, Synapse and STDP Integrated Circuits, Jose M. Cruz-Albrecht, Michael W. Yung, Narayan Srinivasa, IEEE Trans. Biomed. Circuits Sys., vol. 6, No. 3, June 2012, pp. 246-256.
Energy Efficiency of FPGAs and Programmable Processors for Matrix Multiplication, Scrofano, Choi and Prasanna. Proceedings Field-Programmable Technology, 2002. (FPT), pp. 422-425.
Badia, S.B.I., Pyk, P., & Verschure, P. F. (2007). A fly-locust based neuronal control system applied to an unmanned aerial vehicle: the invertebrate neuronal principles for course stabilization, altitude control and collision avoidance. The International Journal of Robotics Research, 26(7), pp. 759-772.
Meng, H, Appiah, K., Yue, S., Hunter, A., Hobden, M., Priestley, N., Hobden, P. & Pettit, C. (2010). A modified model for the Lobula Giant Movement Detector and its FPGA implementation. Computer vision and image understanding, 114(11), pp. 1238-1247.
Yue, S., & Rind, F. C. (2012). Visually stimulated motor control for a robot with a pair of LGMD visual neural networks. International Journal of Advanced Mechatronic Systems, 4(5), pp. 237-247.
O'Shea, M. & Williams, J. L. D. (1974). The anatomy and output connection of a locust visual interneurone; the lobular giant movement detector (LGMD) neurone. Journal of comparative physiology, 91(3), pp. 257-266.
Judge, S., & Rind, F. (1997). The locust DCMD, a movement-detecting neurone tightly tuned to collision trajectories. The Journal of experimental biology, 200 (16), pp. 2209-2216.
Office Action 1 for U.S. Appl. No. 14/795,884, dated Jul. 5, 2017.
Elaborated motion detector based—model, Mihai-Emanuel Bash, et al., Jan. 2010, pp. 192-195.
A biologically inspired analog IC for visual collision detection, Reid R. Harrison, IEEE, 1057-7122, 2005, pp. 2308-2318.
Elaborated Reichardt detectors, Jan P.H. van Santen, et al., 0740-3232, 1985, pp. 300-321.
Reactive direction control—integrated, Shigang Yue, et al., Springer, 2009, pp. 151-167.
Locust's Looming Detectors for Robot Sensors, F. Claire Rind, et al., Springer, 2003, pp. 237-250.
B. K. Horn, Y. Fang and I. Masaki, "Time to contact relative to a planar surface," in IEEE Intelligent Vehicles Symposium, 2007, pp. 68-74.
B. K. Horn, Y. Fang and I. Masaki, "Hierarchical framework for direct gradient-based time-to-contact estimation," in IEEE Intelligent Vehicles Symposium, 2009, pp. 1394-1400.
M. S. Darms, P. E Rybski, C. Baker and C. Urmson, "Obstacle detection and tracking for the urban challenge," in IEEE Transactions on Intelligent Transportation Systems, 2009, pp. 475-485.
G. Alenya, a. Nègre and J. L Crowley, "A comparison of three methods for measure of time to contact," in IEEE/RSJ International Conference on Intelligent Robots and Systems, 2009, pp. 4565-4570.

H. Alvarez, L. Paz, J. Sturm and D. Cremers, "Collision Avoidance for Quadrotors with a Monocular Camera," in International Symposium on Experimental Robotics, 2014, pp. 195-209.
G. De Croon, E. De Weerdt, C. De Wagter, B. Remes and R. Ruijsink, "The appearance variation cue for obstacle avoidance," in IEEE Transactions on Robotics, 2012, pp. 529-534.
J.-O. Lee, K.-H. Lee, S.-H. Park, S.-G. Im and J. Park, "Obstacle avoidance for small UAVs using monocular vision," in Aircraft Engineering and Aerospace Technology, 2011, pp. 397-406.
T. Mori and S. Scherer, "First results in detecting and avoiding frontal obstacles from a monocular camera for micro unmanned aerial vehicles," in IEEE International Conference on Robotics and Automation (ICRA), 2013, pp. 1750-1757.
A. Negre, C. Braillon, J. L Crowley and C. Laugier, "Real-time time-to-collision from variation of intrinsic scale," in Experimental Robotics, 2008, pp. 75-84.
J.-C. Zufferey and D. Floreano, "Fly-inspired visual steering of an ultralight indoor aircraft," in IEEE Transactions on Robotics, 2006, pp. 137-146.
C. Bills, J. Chen and A. Saxena, "Autonomous MAV flight in indoor environments using single image perspective cues," in IEEE international conference on Robotics and automation (ICRA), 2011, pp. 5776-5783.
S. Pundlik, E. Peli and G. Luo, "Time to collision and collision risk estimation from local scale and motion," in Advance in Visual Computing, 2011, pp. 732-741.
Balduzzi, David, and Giulio Tononi. "What can neurons do for their brain? Communicate selectivity with bursts." Theory in Biosciences 132.1 (2013), pp. 27-39.
Nere, Andrew, et al. "A neuromorphic architecture for object recognition and motion anticipation using burst-STDP." PloS one 7.5 (2012), pp. e36958.
Dan Y, Poo MM (2004) Spike timing-dependent plasticity of neural circuits. Neuron 44, pp. 23-30.
Brette, et. Al, "Simulation of networks of spiking neurons: A review of tools and strategies," J Comput Neurosci, (2007), pp. 1-50, DOI 10.1007/s10827-007-0038-6.
Laurent Itti, Christof Koch, "A saliency-based search mechanism for overt and covert shifts of visual attention," Vision Research, 40 (10), pp. 1489-1506, (2000).
Office Action 1 for U.S. Appl. No. 14/680,057, dated Mar. 1, 2017.
Evolving spiking neural networks: A survey, Stefan Schliebs et al., Evolving systems, DOI: 10.1 007/s12530-013-9074-9, Jun. 2013, pp. 1-12.
Image processing with spiking Neuron Networks, Meftah et al., Springer, SCI427, 2012, pp. 525-544.
Artificial Neural image processing applications: A survey, Quintana et al., Advance online publication, 2012, pp. 1-13.
Responce to Office Action 1 for U.S. Appl. No. 14/680,057, dated Jun. 30,2017.

* cited by examiner

SYSTEM AND METHOD FOR ACHIEVING FAST AND RELIABLE TIME-TO-CONTACT ESTIMATION USING VISION AND RANGE SENSOR DATA FOR AUTONOMOUS NAVIGATION

CROSS-REFERENCE TO RELATED APPLICATIONS

The present application is a Continuation-in-Part application of U.S. Ser. No. 15/271,025, filed on Sep. 20, 2016, which is a non-provisional application of U.S. Provisional Application No. 62/221,523, filed on Sep. 21, 2015, both of which are hereby incorporated herein by reference.

The present application is ALSO a Continuation-in-Part application of U.S. Ser. No. 14/795,884, filed Jul. 9, 2015, which is a Continuation-in-Part application of U.S. Ser. No. 14/680,057 filed Apr. 6, 2015, both of which are hereby incorporated herein by reference.

The present application is ALSO a non-provisional patent application of U.S. Provisional Application No. 62/293,649, filed on Feb. 10, 2016, the entirety of which is hereby incorporated herein by reference.

STATEMENT REGARDING FEDERAL SPONSORED RESEARCH OR DEVELOPMENT

This invention was made with Government support under Contract No.HR011-09-C-000 awarded by DARPA. The government has certain rights in the invention.

BACKGROUND OF INVENTION (1) Field of Invention

The present invention relates to a system for detecting obstacles reliably with their ranges by a combination of two-dimensional and three-dimensional sensing and, more specifically, to such a system used to generate an accurate time-to-contact map for purposes of autonomous navigation.

(2) Description of Related Art

Obstacle detection and avoidance is a crucial task that is required to realize autonomous robots and/or navigation. Some systems utilize range sensors, such as LIDAR or RADAR sensors (see the List of Incorporated Literature References, Literature Reference No. 1), that have the ability to provide accurate estimation of looming obstacle collisions. Others have attempted to use smaller sensors such as monocular cameras to detect and avoid looming obstacles (see Literature Reference Nos. 2, 3, 4 and 5). Monocular cameras achieve the low SWaP requirements for autonomous systems; however, one of the main challenges with using monocular cameras is that each camera frame by itself inherently cannot provide depth data from the scene. Thus, depth information and subsequent camera frames are typically used to give an estimation of the depth of the scene.

However, it is challenging to detect obstacles and estimate time-to-contact or time-to-collision (TTC) values reliably and rapidly from passive vision (optical flow, stereo, or structure from motion) due to inconsistent feature tracking, texture-less environments, limited working ranges, and/or intensive computation required. Active range sensing can provide absolute and error-less distances to (both far and near) obstacles; however, these types of sensors (i.e., two-dimensional (2D) laser scanners, three-dimensional (3D) light detection and ranging (LIDAR) or red/green/blue/depth (RGB-D) cameras) are usually heavy/bulky, output sparse point clouds, operate at low frame-rates or are limited to reliably working indoors.

There are many techniques developed for obstacle detection and TTC estimation for autonomous navigation (and also generally for computer vision and robotics applications). For example, most monocular/optical flow based approaches require expensive computations and could produce an unacceptable amount of false detections while providing relative TTC only. Stereo-based depth estimation is limited to the working range (usually shorter look-ahead) constrained by the baseline length and performs very poor in texture-less environments and on homogeneous surfaces. Structure from motion requires at least several frames taken at different viewpoints. Depth estimation by passive sensing (i.e., using cameras) inherently involves errors propagated from the uncertainty in the pixel domain (miss matching, lack of features). On the other hand, active sensing by a laser scanner or a 3D LIDAR sensor can provide absolute and more accurate TTC or depth measurement than 2D, but these types of sensing mostly require high SWaP (i.e., size, weight, and power) and produce sparse point clouds. Optimal fusion using 2D and 3D sensors has not been well exploited for high speed navigation.

Existing TTC Map (or depth map) estimation can be broken down by sensor modality. The most relevant for low SWaP constraints is the usage of a single passive sensor (monocular camera). Methods based on scale change (see Literature Reference Nos. 5 and 6) are often very computationally expensive as they rely on feature tracking and scale change detection via methods like template matching. These methods also provide only relative depth of objects, as they must rely on image segmentation to (for example) distinguish only foreground from background. The lack of absolute TTC and slow process rate does not make them suitable for maneuvers where a quick reaction must be achievable.

Obtaining more accurate depth maps can be done by using learning methods (see Literature Reference Nos. 7 and 8). These methods operate at a lower image domain (pixels/filters on features) and can provide a relative depth map quickly, but do not generalize well to cluttered environments as the learned templates for classifying the image may not cope well with unseen structure or objects.

One of the more popular methods for TTC estimation involves computation of optical flow (see Literature Reference Nos. 6, 8 and 9). However, estimating the optical flow relies on motion parallax. This method often requires tracking feature motion between frames (consuming computation time) and fails for obstacles found along the optical axis of the camera. Another popular method for building TTC Maps is achieved by stereo (see Literature Reference Nos. 10 and 11). Both of these methods quickly compute accurate depth maps, but they are limited to the camera pair baseline with regard to look-ahead time and object perception is limited by the texture and homogeneity of the surface. If one desires to build more accurate TTC/depth maps using structure from motion (as is usually the case in stereo configurations) then one needs to use sufficient (30 or more frames) (see Literature Reference No. 2) to build a dense map where an object can be identified well. Alternatively, although real-time depth maps can be obtained as in (see Literature Reference No. 14) at the loss of point density, such a technique is not suitable for accurate representation of an object.

There are also methods which attempt to fuse multiple sources of information (stereo and monocular cameras) (see Literature Reference No. 9) and (sonar, stereo, scanning laser range finder) (see Literature Reference No. 12). While the depth map accuracy improves significantly, the excessively high SWaP requirement to operate their system limits the mission duration as well as the maneuverability of a robot or autonomous platform. Other methods (see Literature Reference No. 13) provide a depth map wherein a robot could be accurately localized, but objects would be sparsely represented, as structure from motion is the key method of registering auxiliary depth information.

While each of the state-of-the-art methods mentioned above work well in their own regard, they do not yet have the ability to achieve high-speed agile exploration and navigation in cluttered environment under low SWaP constraints. Thus, a continuing need exists for a system that provides for fast and successful obstacle detection and avoidance in autonomous navigation in a timely fashion for a variety of different tasks.

SUMMARY OF INVENTION

This disclosure provides a system for estimating a time-to-contact an object using vision and range sensor data for autonomous navigation. In various embodiments, the system includes one or more processors and a memory. The memory has executable instructions encoded thereon, such that upon execution of the instructions, the one or more processors perform several operations of, such as segmenting an image from a monocular video into multiple object regions of interest, the image being of a scene proximate a mobile platform; calculating time-to-contact (TTC) values by estimating motion field and operating on image intensities; generating a two-dimensional TTC map by estimating average TTC values over the multiple object regions of interest; generating a three-dimensional TTC map by fusing range depth data from a range sensor with the image; and generating a range-fused TTC map by averaging the 2D TTC map and the 3D TTC map.

In another aspect, the system performs operations of detecting an object in the range-fused TTC map, and generating a command (such as move left, etc.) to cause a mobile platform to move to avoid contact with the object.

Further, in generating the 3D TTC map, a range data reading is associated with each pixel in the image.

In another aspect, in generating the range-fused TTC map, the range-fused TTC map is generated with range-seeded propagation of disparity and integrated with salient features in foreground objects to generate precise obstacle boundaries and TTC for objects in the scene proximate the mobile platform.

In yet another aspect, in segmenting an image from the monocular video into multiple object regions of interest, a foreground detector is used to segment objects within a foreground of the image.

Additionally, a spiking neural network is used to calculating time-to-contact (TTC) values by estimating motion field and operating on image intensities.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
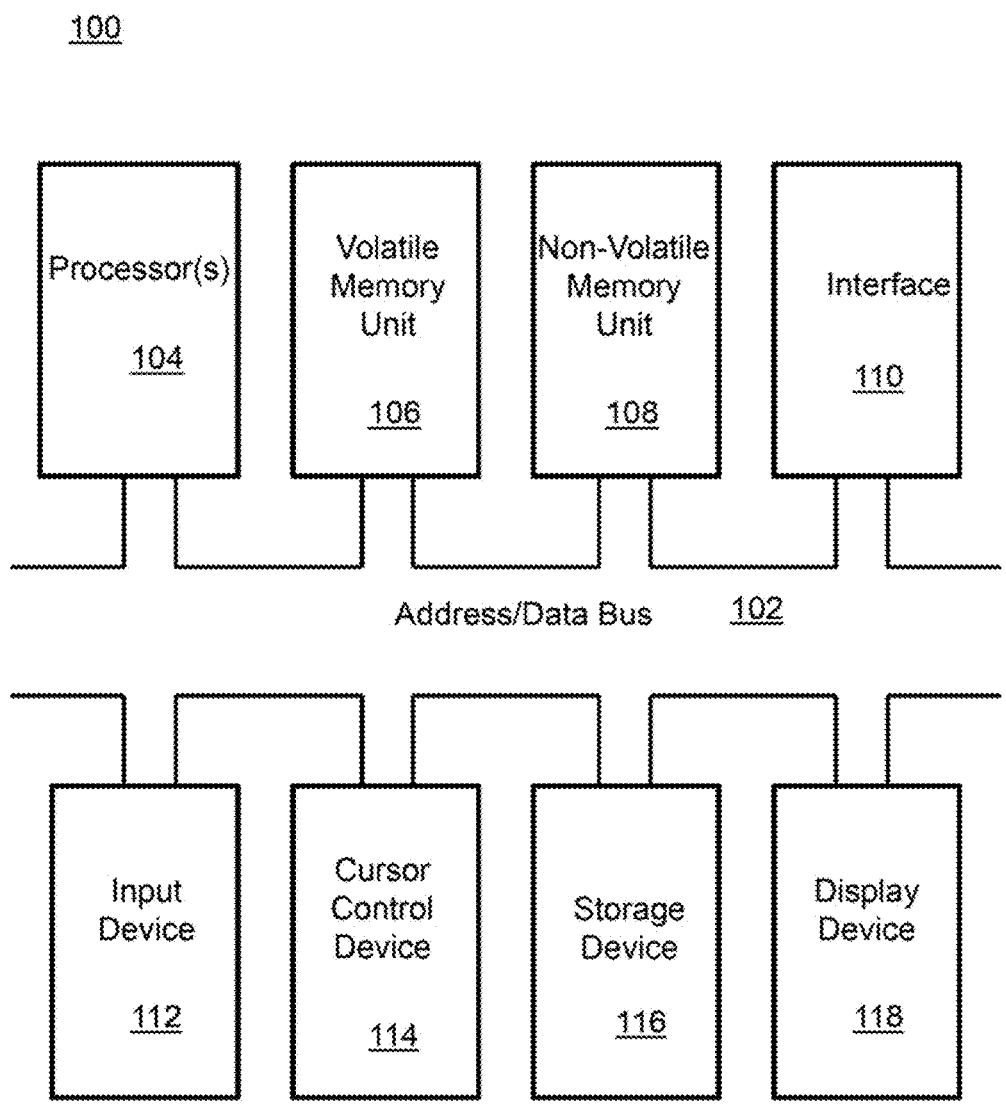
FIG. 1 is a block diagram depicting the components of a system according to various embodiments of the present invention.

The present invention relates to a system for detecting obstacles reliably with their ranges by a combination of two-dimensional and three-dimensional sensing and, more specifically, to such a system used to generate an accurate time-to-contact map for purposes of autonomous navigation. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. M. S. Darms, P. E. Rybski, C. Baker and C. Urmson, "Obstacle detection and tracking for the urban challenge," in IEEE Transactions on Intelligent Transportation Systems, 2009.
2. H. Alvarez, L. Paz, J. Sturm and D. Cremers, "Collision Avoidance for Quadrotors with a Monocular Camera," in International Symposium on Experimental Robotics, 2014.
3. G. De Croon, E. De Weerdt, C. De Wagter, B. Remes and R. Ruijsink, "The appearance variation cue for obstacle avoidance," in IEEE Transactions on Robotics, 2012.
4. J.-O. Lee, K.-H. Lee, S.-H. Park, S.-G. Im and J. Park, "Obstacle avoidance for small UAVs using monocular vision," in Aircraft Engineering and Aerospace Technology, 2011.
5. T. Mori and S. Scherer, "First results in detecting and avoiding frontal obstacles from a monocular camera for micro unmanned aerial vehicles," in IEEE International Conference on Robotics and Automation (ICRA), 2013.
6. Sagar and Viser, Obstacle Avoidance by Combining background subtraction, optical flow and proximity Estimation, International Micro Air Vehicle Conference and Competition 2014 (IMAV), Delft, The Netherlands, 2014.
7. Lenz, Saxena, Low-Power Parallel Algorithms for Single Image based Obstacle Avoidance in Aerial Robots, International Conference on Intelligent Robots and Systems (IROS) 2012.
8. Roberts and Dellaert, Direct Superpixel Labeling for Mobile Robot Navigation, International Conference on Intelligent Robots and System (IROS) 2014.
9. Sukhatme, Combined Optical-Flow and Stereo-Based Navigation of Urban Canyons for a UAV. International Conference on Robots and Systems (IROS), 2005.
10. Roland Brockers, Yoshiaki Kuwata, Stephan Weiss, Lawrence Matthies, Micro air Vehicle Autonomouse Obstacle Avoidance from Stereo-Vision, Unmanned Systems Technology, 2014.
11. Andrew J. Barry and Russ Tedrake. "Pushbroom stereo for high-speed navigation in cluttered environments." In 3rd Workshop on Robots in Clutter: Perception and Interaction in Clutter, Chicago, Ill., September 2014.
12. Matthias Nieuwenhuisen, David Droeschel, Dirk Holz, Sven Behnke, "Omni-directional Obstacle Perception and Collision Avoidance for Micro Aerial Vehicles," Robotics Science and Systems (RSS) 2013.
13. J. Zhang, M. Kaess, and S. Singh, "Real Time Depth Enhanced Monocular Odometry," International Conference on Intelligent Robots and System (IROS) 2014.
14. Georg Klein and David Murray Parallel Tracking and Mapping for Small AR Workspaces In Proc. International Symposium on Mixed and Augmented Reality (2007).
15. B. K. P Horn & B. G. Schunck, "Determining Optical Flow," Artificial Intelligence, Vol. 16, No. 1-3, August 1981, pp. 185-203.
16. Alexander L. Honda, Yang Chen, Deepak Khosla, "Robust static and moving object detection via multi-scale attentional mechanisms", Proceedings of SPIE Vol. 8744, 87440S (2013).
17. U.S. patent application Ser. No. 14/795,884, filed Jul. 9, 2015, entitled, "System and Method for Real-Time Collision Detection."

(2) Principal Aspects

Various embodiments of the invention include three "principal" aspects. The first is a system used to generate an accurate time-to-contact map for autonomous navigation. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.)

coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
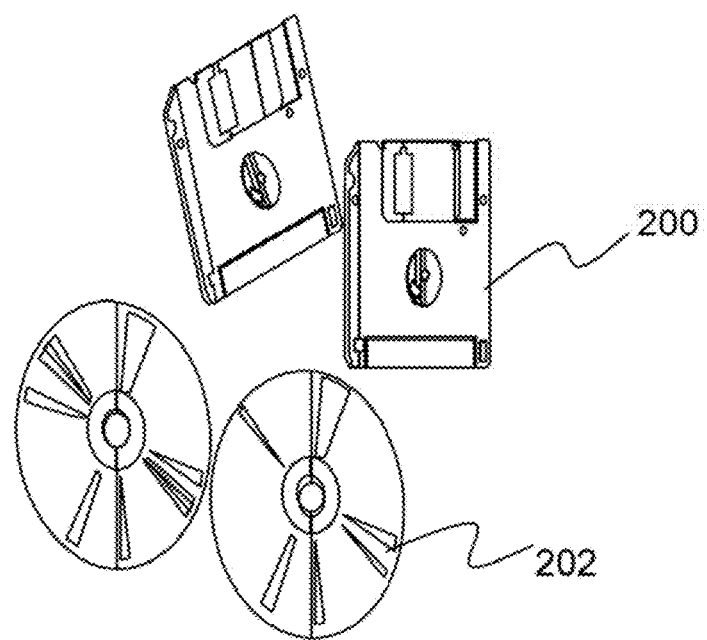
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Obstacle detection and avoidance is a crucial task that is required to realize autonomous robots and/or navigation. In operation, depth information and subsequent camera frames are typically used to give an estimation of the depth of the scene. Given this depth (and the change in depth over time), an autonomous navigation system can estimate a time-to-contact or time-to-collision (TTC) value which can be used to detect and avoid looming obstacles. The system of this disclosure improves upon the prior art by fusing monocular obstacle detection and avoidance (such as those systems shown in Literature Reference No. 17) with a LIDAR system. Thus, this disclosure is directed to a robotic system for detecting obstacles reliably with their ranges via two-dimensional (2D) (e.g., image) and three-dimensional (3D) (e.g., LIDAR) sensing to generate an accurate dense time-to-contact (TTC) map that is used to avoid such obstacles.

By estimating the TTC, the system can determine if there is an imminent obstacle for autonomous navigation. Furthermore, by estimating the TTC in different regions of interest, the system is able to make a calculated choice for path planning. Unique aspects of the system include (1) vision-based looming foreground detection that combines neuromorphic (or optical flow-based) obstacle detection and foreground-background estimation for high-speed reactive navigation, and (2) fusion of long-range sparse 3D with dense monocular camera to give a robust (and absolute) dense TTC map for obstacle detection. The neuromorphic and fusion solution of the system works in complex, cluttered environments, including small obstacles such as tree branches found outdoors or toppled objects indoors. The system also provides accurate detection in all ambient conditions including structured/unstructured environments using wide-angle detection to keep objects of interest in view while making aggressive maneuvers at high speed.

The system described herein greatly improves upon the state of the art for several reasons. For example, the bio-inspired and neuromorphic approach of TTC map estimation is efficient (by search space reduction), reliable (by foreground segmentation), and fast and low-power consuming (by neuromorphic implementation). TTC computation can be greatly accelerated by preprocessing the incoming video using a foreground/background separation algorithm. A purpose of foreground detection is to locate potential obstacle regions and pass them on to the TTC estimation stage, significantly reducing the amount of run-time processing of TTC by two to ten times (assuming targets occupy 10%-50% of the entire scene). It will also increase the robustness of TTC since TTC values in a region-of-interest (ROI) can be integrated only on foreground areas thus reducing false alarms. This will also increase the robustness to scene noise via the elimination of background (e.g., sky, ground-plane). Further, when 3D range sensing is available or is needed to complete a specific mission (e.g., when lighting conditions change significantly, far-distanced obstacles need to be detected earlier, or there is an extra room in the system payload), the vision-based algorithm of the system can be augmented with 3D range information, by combining gridded monocular TTC estimation with 3D-based TTC estimation for increased accuracy. The gridded TTC estimation is also memory efficient by representing object information in the form of a TTC map instead of a discretized world.

As can be appreciated by those skilled in the art, the system of this disclosure can be applied to any system that requires a highly accurate TTC map for the purposes of obstacle detection and avoidance. For example, the final range-fused TTC map is useful for obstacle detection and avoidance on autonomous mobile platforms (e.g., unmanned aerial vehicles (UAV's) and self-driving cars). Such mobile platforms are a natural fit for this invention because many such systems endeavor on autonomous navigation and exploration with no collision. The ability to detect and avoid obstacles with high accuracy increases the probability of mission success and is required for other subsequent processes such as global navigation and path planning modules. Other non-limiting examples of useful applications include indoor mapping, hazardous/forbidden area exploration, environment monitoring, virtual tours, blind people assistance, etc. For further understanding specific details regarding the system are provided below.

(4) Specific Details of Various Embodiments

Figure 3:
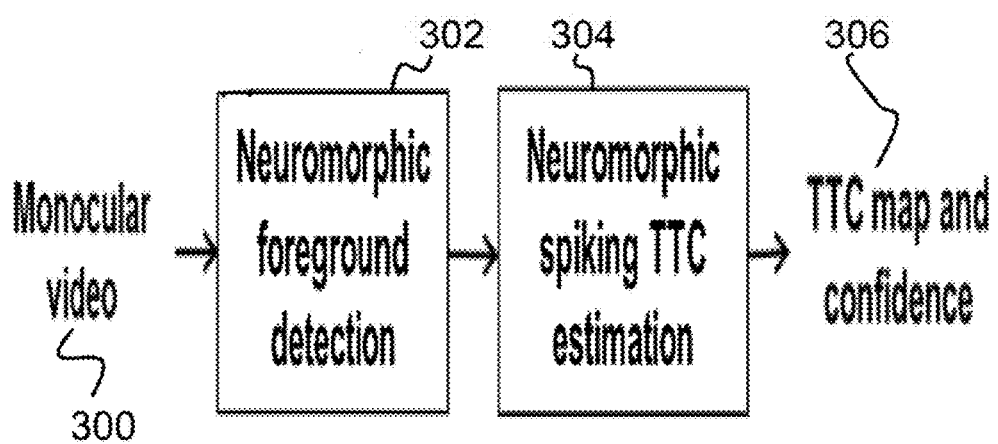
FIG. 3 is an illustration of time-to-contact (TTC) map estimation from monocular vision.
Figure 7:
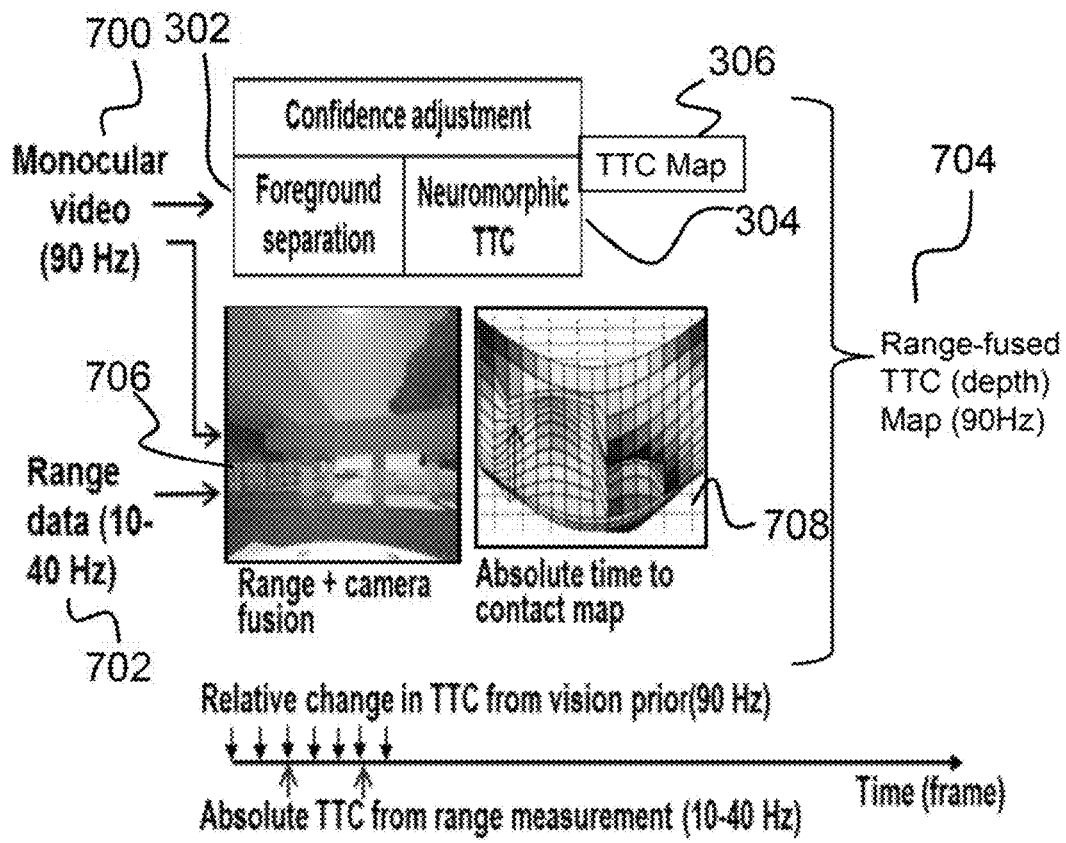
FIG. 7 is an illustration of three-dimensional (3D) range information which can be seamlessly combined with vision in the framework of the system described herein for a long-range, dense TTC map.

As noted above, the system of this disclosure provides for fusion of an improved 2D TTC calculation system with interpolated LIDAR data (and its corresponding 3D TTC estimate or map). First and as shown in FIG. 3, the system receives sensor data 300 (e.g., from a monocular video camera) which is used for the pre-TTC computation stage of background-foreground segmentation (i.e., neuromorphic foreground detection 302). Then the underlying approach for TTC calculation is performed (i.e., neuromorphic spiking TTC estimation 304) to generate a 2D TTC map 306. Finally, the LIDAR based TTC estimation is performed to generate the absolute 3D TTC map and its fusion with the 2D system is performed to generate the resulting range-fused TTC map (as shown in FIG. 7).

In other words, based on prior work with spike-based processing for "looming" obstacle detection (see Literature Reference No. 17) and foreground-background estimation from a fast moving camera platform in high-clutter (see Literature Reference No. 16), the present invention augments and combines them to enable accurate and high-update rate detection of obstacles and TTC estimates in the camera frame.

For neuromorphic foreground detection 302, the system uses a vision-based looming foreground detector with TTC estimation that is inspired by the locust loom-detection model and implemented using a spiking neural network (SNN) approach (see Literature Reference No. 17). It has been previously demonstrated that a TTC map based on spiking responses can be supplemented in local image regions with rapid optical flow calculation (see Literature Reference No. 17). Camera rotation is compensated for via IMU integration and a correcting homography transformation.

Figure 4A:
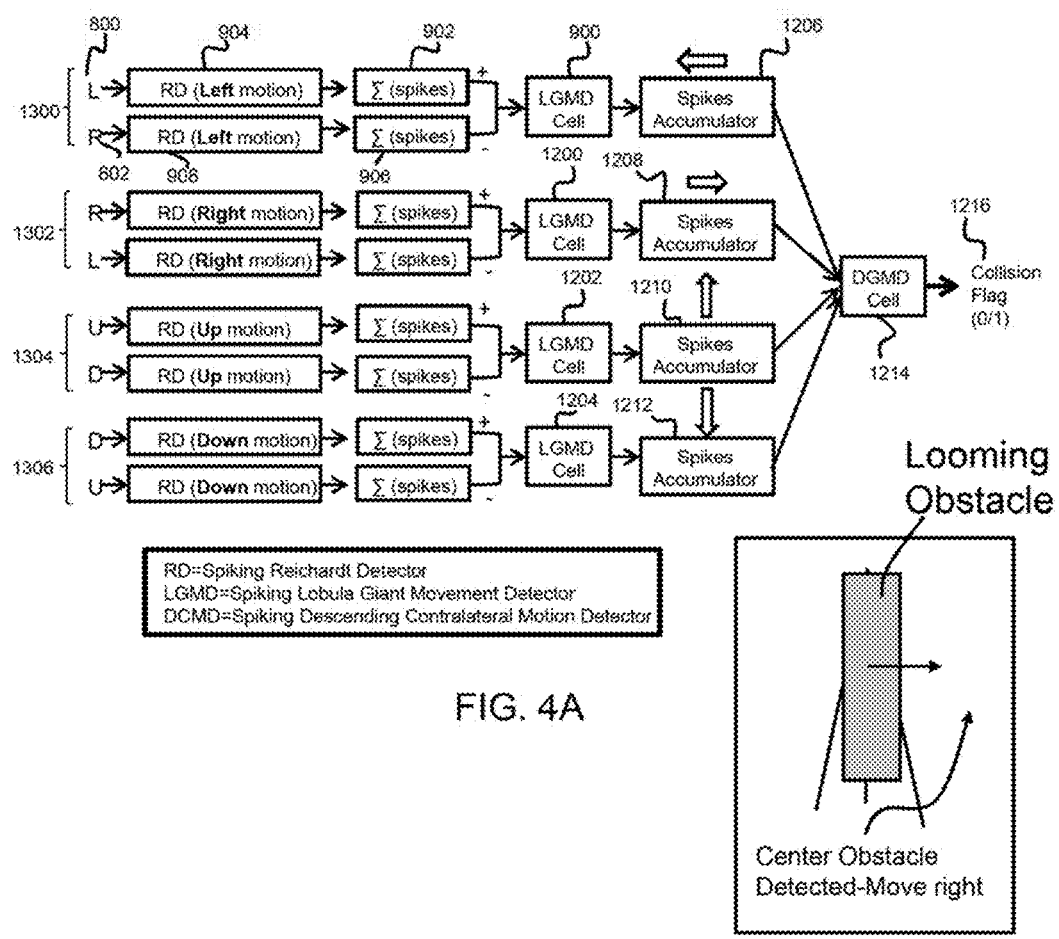
FIG. 4A is an illustration of a spike-based collision detection architecture, where spike stage indicates collision warning.

An example of the looming foreground detector that provides for neuromorphic foreground detection 302 is depicted in FIG. 4A. The looming foreground detector in this example requires 5 neurons per pixel and can be efficiently mapped to a spike-based processor (e.g., 320×240 image, 30 Hz, 2.5 mW). Note that spike-domain processing is not a requirement of this system as it can also be run in a non-spiking domain.

Figure 4B:
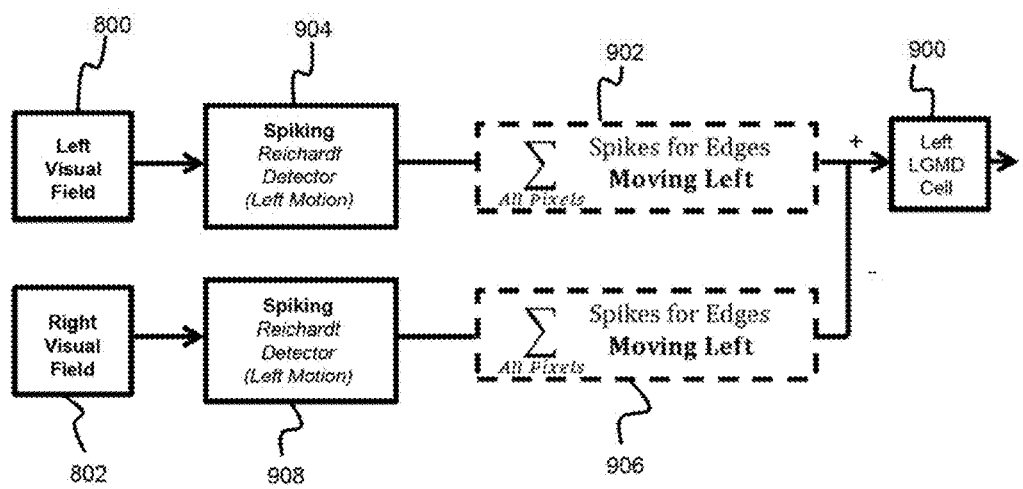
FIG. 4B is an illustration of a first part of the spike-based collision detection architecture.
Figure 4C:
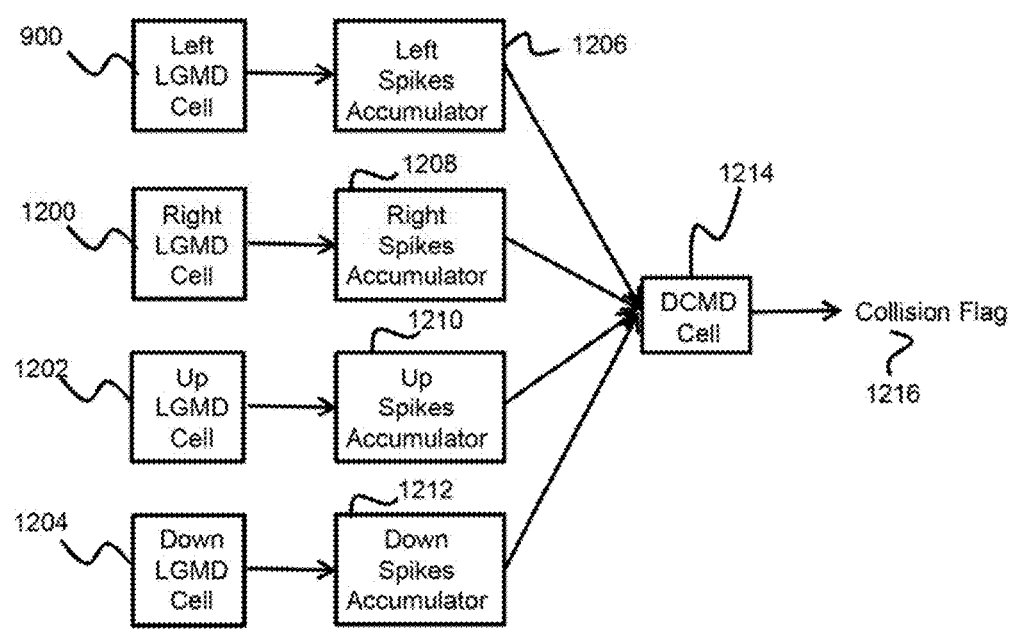
FIG. 4C is an illustration of a second pan of the spike-based collision detection architecture.

More specifically, FIG. 4A shows an overall diagram of the spiking collision detection model according to some embodiments of the present invention. The diagram illustrates the combination of the first part of the spiking collision detection model, which is shown in FIG. 4B, and the second part of the spiking collision detection model (the DCMD cell model), which is shown in FIG. 4C. As depicted in FIG. 4A, for the detection of left motion 1300, the excitatory input to the model left LGMD cell 900 is all the spikes for edges moving left 902 that are the output of the spiking Reichardt detector for detecting left motion 904 on the left visual field 800. The inhibitory (negative) input is all the spikes for edges moving left 906 that are the output of the spiking Reichardt detector for detecting left motion 908 on the right visual field 802. The left spikes accumulator 1206 accumulates spikes from the model left LGMD cell 900 for detection of left motion 1300. The above is also true for the detection of right motion 1302, up motion 1304, and down motion 1306. As described in FIG. 4C, the model DCMD cell 1214 sums all spikes accumulators (elements 1206, 1208, 1210, and 1212) and decides whether to generate a collision flag 1216. This process is described in further detail in U.S. Ser. No. 14/795,884, titled System and Method for Real-Time Collision Detection, filed Jul. 9, 2015, the entirety of which is incorporated herein by reference.

TTC computation can be greatly accelerated by preprocessing the incoming video using a foreground/background separation algorithm. The purpose of foreground detection 302 is to locate potential obstacle regions and pass them on to the TTC estimation stage (i.e., element 304), significantly reducing the amount of run-time processing of TTC by 2-10 times (assuming targets occupy 10-50% of the entire scene). The foreground separation will also increase the robustness of TTC since TTC values in ROI can be integrated only on foreground areas, thus reducing false alarms. Although other techniques may be used for foreground detection 302, the neuromorphic and bio-inspired method (see Literature Reference No. 16) based on spectral residual saliency (RS) is desirable due to its speed and efficiency. The RS method exploits the inverse power law of natural images with the observation that the average of log-spectrums is locally smooth. This enables detecting salient objects based on the log-spectrum of individual images rather than ensemble of images thus streamlining the process to operate on a frame by frame basis. This segmented image (from element 302) is then fed to the 2D TTC map building method.

With respect to the present invention, the system builds a Time-To-Contact (TTC) Map using a monocular camera by directly estimating the motion field and operating on image intensities. The underlying assumption that allows for simplification of the TTC calculation is the constant brightness assumption as referenced in Literature Reference No. 15, and as copied below:

$$\frac{d}{dt}E(x, y, t) = 0$$

The equation provided above is the constant brightness assumption equation. If E(x, y, t) is the brightness at image point (x, y) at time t, then it is assumed that this equation holds. That is, it is assumed that as the image of some feature moves, it does not change brightness.

The simplest case of obstacle detection is to constrain the robot to motion along the optical axis towards a planar object whose normal is also perpendicular to the camera's optical axis. In this scenario, the components of motion (U,V) of a point along the axes perpendicular to the optical axis are 0. Thus, using the perspective projection equations and taking the derivative, it is determined that:

$$-\frac{\dot{Z}}{Z}(xE_x + yE_y) + E_t = 0$$

which can be simplified as follows:

$$CG + E_t = 0$$

where C=−W/Z=1/TIC (Z=pixel location in space along optical axis, W=derivative of said pixel location) and G=xEx+yEy. The above can now be formulated as a least-squares problem where the sum is taken over all pixels in a region of interest:

$$\sum_{x,y}(CG + E_t)^2$$

After minimizing the problem and solving for C (the inverse of the TTC), the following result is obtained:

$$C = -\frac{\sum_{x,y} GE_t}{\sum_{x,y} G^2}$$

Intuitively, the TTC is seen as the spatial change in image intensities divided by the temporal change of the pixel intensities. Since an object closer to the camera will expand faster than one in the background, this directly translates to a larger Et and a smaller "radial gradient", xEx+yEy, over the region of interest. The inverse is true for objects further away, particularly for well textured objects where the gradient is strong.

When the problem cannot be simplified by the above mentioned motion assumption, a more general approach must be taken. In the cases of arbitrary motion relative to a plane perpendicular to the optical axis or translational motion along the optical axis relative to an arbitrary plane, both have a closed form solution requiring only the solution to three equations in three unknowns. In the slightly more complicated case where the motion and plane are a combination of the two latter cases, then, an iterative method must be used. Here, due to the non-linear nature of the equations, an initial guess for a subset of the parameters must be proffered, after which alternation is employed for a few iterations to approximate the TTC.

Figure 5:
FIG. 5 is an illustration of two-dimensional (2D) TTC calculation on a gridded image without segmentation.

If it is desired to localize objects more accurately, the image can be partitioned into a larger grid. While this allows for a finer resolution of the object to be determined, a more segmented object is determined as some areas may not be sufficiently textured to exhibit the same TTC as other regions. FIG. 5 shows the 2D gridded approach without foreground-background segmentation. Specifically, FIG. 5 depicts a fixed grid 502 of a segmented image. In other words, the image is segmented into a fixed grid 502 having a plurality of sub-regions. Although for clarity a single TTC graph 504 is depicted, it should be understood that each sub-region includes a TTC graph 504. Each TTC graph 504 shows the TTC value changes over time in the corresponding sub-region 506 in the fixed grid 502. The line (at the value 120) indicates a predetermined threshold for collision detection. In this example, if TTC>120, then there could be a collision in the sub-region 506. The x-axis in the TIC graph 504 is frame number, while the y-axis is frames-to-collision. In other words, the mobile platform will hit an obstacle after y frames. The actual time depends on the frame rate of sensing. For example, in the 30 frames per second (fps) sensor system, y=120, meaning that the mobile platform has 4 seconds until collision with the obstacle.

Figure 6:
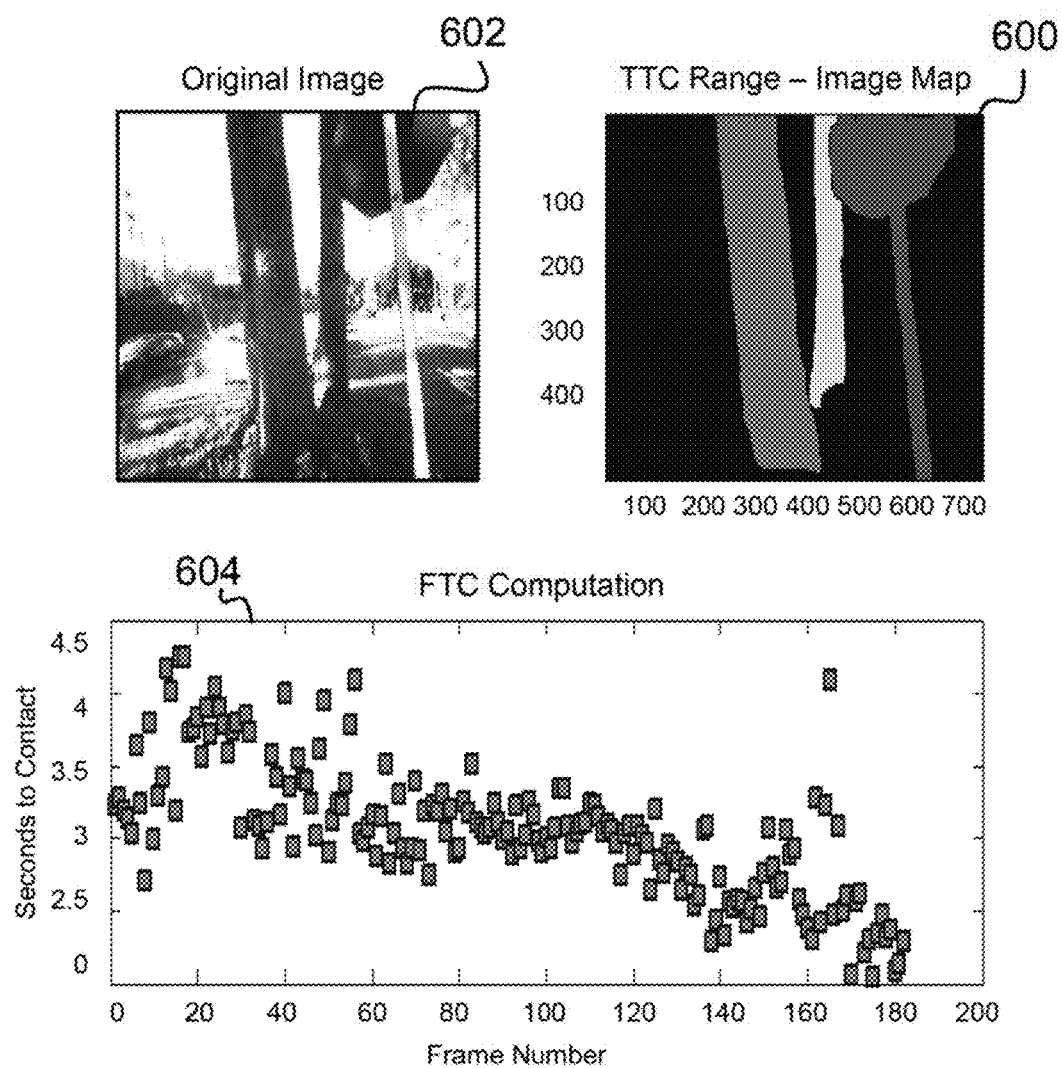
FIG. 6 is an illustration of TTC calculation on a segmented image.

If a segmented image is fed to the 2D TTC system, a more accurate estimate can be obtained. Given the estimate of the TTC (here determined as Frames-To-Collision) one can use the frame rate (difference between input frame time stamps) to compute an absolute time until collision. Then, given a velocity estimate, one can build a depth map, which can be used to generate move commands for the mobile platform to cause the mobile platform to avoid the collision (e.g., move right in 10 feet, etc.). An experiment was conducted to evaluate the monocular vision-based time to contact using a Kinect RGBD sensor and a core i5 NUC mounted on a quadcopter. Using the depth data for ground-truth only, TTC accuracy was estimated at a range of 10 m to be approximately 90% for up to 3 objects in the path of the quadcopter across a range of indoor object types and lighting conditions. FIG. 6 shows an example TTC map 600 obtained once the background has been eliminated from the original image 602, as well as time to collision for a certain region of interest.

Unlike the TTC value grid in FIG. 5, FIG. 6 shows TTC 600 per each segmented region (in this case, two trees and a stop sign) obtained from the foreground detector 302 (as shown in FIGS. 3 and 4). The bottom graph depicts a resulting frame-to-collision computation 604, which shows the time to collision (in seconds) decreasing as frames progress, meaning in this example that the sensor platform is approaching an object and has y seconds to contact at frame x.

The method in this disclosure proceeds to make use of absolute range data to build a more accurate TTC map. Since what is of interest is detection of objects over a large range, disparate sources of information must be fused together. A camera image provides information useful in resolving object boundaries, while a 3D LIDAR range finder provides depth information which becomes sparser and more diffuse as distance to target increases.

FIG. 7 shows how the vision-based framework of the present invention can be seamlessly augmented with range information (e.g., from a laser scanner) to compute a long-range TTC map. Specifically, FIG. 7 illustrates how the high-frequency vision-based method of TTC estimation (as shown in FIGS. 3 and 4) can be combined with low to mid frequency range data provided by a range sensor, like LIDAR or a laser scanner. The inputs to the fusion system are a monocular video stream 700 and range data 702 and the output is a range-fused dense TTC map 704 that can be used as described above. The detailed fusion procedure is provided in further detail below.

To fuse the information (i.e., monocular video stream 700 and range data 702), each LIDAR reading is associated with a pixel in the image (obtained from the video stream 700) to generate a range data/camera fusion 706. To construct the dense TTC map 704, for every pixel, its neighbors are searched for matching color values and range readings with search radius guided by the distance to target and LIDAR scanline resolution. The final distance is determined as averaging of a box filter with each element weighted by pixel similarity and anchored at the center of the filter. The method has the effect of super-resolving sparse 3D points; thus creating a denser range map (converted to an absolute TTC map 708 by using the known velocity).

The 2D portion of the process is depicted in FIG. 3 and described above, in which the monocular video stream 700 proceed through foreground separation 302 and neuromorphic spiking TTC estimation 304 to generate the resulting 2D TTC map 306.

The final step is averaging of the TTC maps 306 and 708 obtained by the 2D and 3D systems to generate the range-fused TTC map 704, which reduces false detections and provides absolute TTC (depth) measurement by Kalman filtering fusion. The fusion algorithm of the present system gives a precise obstacle boundary and TTC via range-seeded propagation of disparity and integrating with the salient features in the foreground objects. One key benefit of this approach is that it gives an approximate two to five times higher density of point cloud in the 3D space, which can then be used to do obstacle detection even in the 3D point cloud space.

An experiment has been conducted that fuses data from a LadyBug camera (produced by Point Grey Research, located at 12051 Riverside Way Richmond, BC, Canada) and a Velodyne HDL-32E LIDAR (produced by Velodyne, located at 345 Digital Drive, Morgan Hill, Calif. 95037) to detect obstacles and build a TTC map. Experimental results suggest that the fusion scheme has detection accuracy of 80% (compared to 47% with LIDAR only) for human-size obstacles at a distance of 25 meters and that fused results have a greater probability (greater than 50%) at longer ranges than raw or 2D TTC information alone.

The average neighboring-point distance and density in a 3D point cloud cluster can directly affect the probability of obstacle detection. For example, for a human object detection using K-means clustering, the 2D/3D fusion method can still detect 80% (compared to the raw case at <50%) when placed at 25 meter. Note that depending on the choice of threshold/scaler in the obstacle detection/clustering algorithm, the probability could be higher (a more relaxed algorithm) or lower (a more strict algorithm).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

The invention claimed is:

1. A system for estimating a time-to-contact an object using vision and range sensor data for autonomous navigation, comprising:
   one or more processors and a memory, the memory having executable instructions encoded thereon, such that upon execution of the instructions, the one or more processors perform operations of:
      segmenting an image from a monocular video into multiple object regions of interest, the image being of a scene proximate a mobile platform;
      calculating time-to-contact (TTC) values by estimating motion field and operating on image intensities;
      generating a two-dimensional (2D) TTC map by estimating average TTC values over the multiple object regions of interest;
      fusing range depth data from a range sensor with the image to generate a three-dimensional (3D) TTC map; and
      generating a range-fused TTC map by averaging the 2D TTC map and the 3D TTC map.

2. The system as set forth in claim 1, further comprising operations of:
   detecting an object in the range-fused TTC map; and
   generating a command to cause a mobile platform to move to avoid contact with the object.

3. The system as set forth in claim 1, wherein in generating the 3D TTC map, a range data reading is associated with each pixel in the image.

4. The system as set forth in claim 1, wherein in generating the range-fused TTC map, the range-fused TTC map is generated with range-seeded propagation of disparity and integrated with salient features in foreground objects to generate precise obstacle boundaries and TTC for objects in the scene proximate the mobile platform.

5. The system as set forth in claim 1, wherein in segmenting an image from the monocular video into multiple object regions of interest, a foreground detector is used to segment objects within a foreground of the image.

6. The system as set forth in claim 1, wherein a spiking neural network is used to calculate TTC values by estimating motion field and operating on image intensities.

7. The system as set forth in claim 1, wherein in generating the 3D TTC map, a range data reading is associated with each pixel in the image;
   wherein in generating the range-fused TTC map, the range-fused TTC map is generated with range-seeded propagation of disparity and integrated with salient features in foreground objects to generate precise obstacle boundaries and TTC for objects in the scene proximate the mobile platform;

wherein in segmenting an image from the monocular video into multiple object regions of interest, a foreground detector is used to segment objects within a foreground of the image; and wherein a spiking neural network is used to calculate TTC values by estimating motion field and operating on image intensities.

8. A computer program product for estimating a time-to-contact an object using vision and range sensor data for autonomous navigation, the computer program product comprising:

a non-transitory computer-readable medium having executable instructions encoded thereon, such that upon execution of the instructions by one or more processors, the one or more processors perform operations of:

segmenting an image from a monocular video into multiple object regions of interest, the image being of a scene proximate a mobile platform;

calculating time-to-contact (TTC) values by estimating motion field and operating on image intensities;

generating a two-dimensional (2D) TTC map by estimating average TTC values over the multiple object regions of interest;

fusing range depth data from a range sensor with the image to generate a three-dimensional (3D) TTC map; and generating a range-fused TTC map by averaging the 2D TTC map and the 3D TTC map.

9. The computer program product as set forth in claim 8, further comprising instructions for causing the one or more processors to perform operations of:

detecting an object in the range-fused TTC map; and
generating a command to cause a mobile platform to move to avoid contact with the object.

10. The computer program product as set forth in claim 8, wherein in generating the 3D TTC map, a range data reading is associated with each pixel in the image.

11. The computer program product as set forth in claim 8, wherein in generating the range-fused TTC map, the range-fused TTC map is generated with range-seeded propagation of disparity and integrated with salient features in foreground objects to generate precise obstacle boundaries and TTC for objects in the scene proximate the mobile platform.

12. The computer program product as set forth in claim 8, wherein in segmenting an image from the monocular video into multiple object regions of interest, a foreground detector is used to segment objects within a foreground of the image.

13. The computer program product as set forth in claim 8, wherein a spiking neural network is used to calculate TTC values by estimating motion field and operating on image intensities.

14. The computer program product as set forth in claim 8, wherein in generating the 3D TTC map, a range data reading is associated with each pixel in the image;

wherein in generating the range-fused TTC map, the range-fused TTC map is generated with range-seeded propagation of disparity and integrated with salient features in foreground objects to generate precise obstacle boundaries and TTC for objects in the scene proximate the mobile platform;

wherein in segmenting an image from the monocular video into multiple object regions of interest, a foreground detector is used to segment objects within a foreground of the image; and wherein a spiking neural network is used to calculate TTC values by estimating motion field and operating on image intensities.

15. A computer implemented method for estimating a time-to-contact an object using vision and range sensor data for autonomous navigation, the method comprising an act of:

causing one or more processors to execute instructions encoded on a non-transitory computer-readable medium, the one or more processors perform operations of:

segmenting an image from a monocular video into multiple object regions of interest, the image being of a scene proximate a mobile platform;

calculating time-to-contact (TTC) values by estimating motion field and operating on image intensities;

generating a two-dimensional (2D) TTC map by estimating average TTC values over the multiple object regions of interest;

fusing range depth data from a range sensor with the image to generate a three-dimensional (3D) TTC map; and generating a range-fused TTC map by averaging the 2D TTC map and the 3D TTC map.

16. The method as set forth in claim 15, further comprising operations of:

detecting an object in the range-fused TTC map; and
generating a command to cause a mobile platform to move to avoid contact with the object.

17. The method as set forth in claim 15, wherein in generating the 3D TTC map, a range data reading is associated with each pixel in the image.

18. The method as set forth in claim 15, wherein in generating the range-fused TTC map, the range-fused TTC map is generated with range-seeded propagation of disparity and integrated with salient features in foreground objects to generate precise obstacle boundaries and TTC for objects in the scene proximate the mobile platform.

19. The method as set forth in claim 15, wherein in segmenting an image from the monocular video into multiple object regions of interest, a foreground detector is used to segment objects within a foreground of the image.

20. The method as set forth in claim 15, wherein a spiking neural network is used to calculate TTC values by estimating motion field and operating on image intensities.

21. The method as set forth in claim 15, wherein in generating the 3D TTC map, a range data reading is associated with each pixel in the image;

wherein in generating the range-fused TTC map, the range-fused TTC map is generated with range-seeded propagation of disparity and integrated with salient features in foreground objects to generate precise obstacle boundaries and TTC for objects in the scene proximate the mobile platform;

wherein in segmenting an image from the monocular video into multiple object regions of interest, a foreground detector is used to segment objects within a foreground of the image; and wherein a spiking neural network is used to calculate TTC values by estimating motion field and operating on image intensities.

* * * * *